United States Patent
Prunarety et al.

(10) Patent No.: US 8,469,143 B2
(45) Date of Patent: Jun. 25, 2013

(54) BAFFLE WITH ENHANCED ACOUSTIC DAMPING PROPERTIES

(75) Inventors: Fabrice Prunarety, St Satur (FR); Jean-Luc Wojtowicki, Pouilly sur Loire (FR); Josef Hudina, Ketsch (DE)

(73) Assignee: Henkel AG & Co. KGaA

(*) Notice: Subject to any disclaimer, the term of this patent is extended or adjusted under 35 U.S.C. 154(b) by 0 days.

(21) Appl. No.: 13/161,644

(22) Filed: Jun. 16, 2011

(65) Prior Publication Data
US 2012/0010367 A1 Jan. 12, 2012

Related U.S. Application Data (63) Continuation of application No. PCT/EP2008/010711, filed on Dec. 16, 2008.

(51) Int. Cl.
- *F01N 1/24* (2006.01)
- *F01N 1/10* (2006.01)
- *B29C 45/00* (2006.01)
- *C08L 47/00* (2006.01)

(52) U.S. Cl.
USPC ........... 181/256; 181/264; 277/627; 277/916; 277/944; 296/187.02; 428/192; 525/89; 525/92 B; 525/92 C; 525/92 F; 525/98

(58) Field of Classification Search
USPC ........... 428/192; 277/627, 916, 944; 181/256, 181/264; 296/187.02; 264/328.1, 331.13, 264/331.19; 525/89, 92 B, 92 C, 92 F, 98
See application file for complete search history.

(56) References Cited

U.S. PATENT DOCUMENTS

| | | | |
|---|---|---|---|
| 4,987,194 A | 1/1991 | Maeda et al. | |
| 6,114,004 A * | 9/2000 | Cydzik et al. | 428/81 |
| 6,146,565 A | 11/2000 | Keller | |
| 6,368,438 B1 | 4/2002 | Chang et al. | |
| 6,413,611 B1 | 7/2002 | Roberts et al. | |
| 7,313,865 B2 * | 1/2008 | Czaplicki et al. | 29/897.2 |
| 8,079,442 B2 * | 12/2011 | Wojtowicki | 181/264 |
| 2003/0125462 A1 * | 7/2003 | Hubbard et al. | 525/92 B |
| 2007/0100060 A1 * | 5/2007 | Tahri et al. | 524/502 |

FOREIGN PATENT DOCUMENTS

| | | |
|---|---|---|
| WO | 0003894 A1 | 1/2000 |
| WO | 0183206 A1 | 11/2001 |
| WO | 2007039308 A1 | 4/2007 |
| WO | 2007039309 A1 | 4/2007 |
| WO | 2009021537 A1 | 2/2009 |
| WO | 2009036784 A1 | 3/2009 |

OTHER PUBLICATIONS

ASTM D1238-10, "Standard Test Method for Melt Flow Rates of Thermoplastics by Extrusion Plastometer", Copyright ASTM International, West Conshohocken, PA, Mar. 31, 2011, 15 pages.
International Search Report for International application PCT/EP2008/010711, mailed Sep. 30, 2009, 4 pages.

* cited by examiner

*Primary Examiner* — Fred M Teskin
(74) *Attorney, Agent, or Firm* — Mary K. Cameron (57) ABSTRACT

An insert for sealing and acoustic damping of a longitudinal cavity having an interior surface, comprising: a) one or more carrier plates made of a polymeric material (A) which does not deform when heated to a temperature not higher than 180° C. and which comprises a main polymer (A1) which gives mechanical strength to the carrier plate, and—at least one vibration-damping polymer (A2), and b) a thermally expandable material (B). The vibration-damping polymer (A2) is preferably selected from the group comprising: thermoplastic polyurethanes, styrene/butadiene block copolymers, hydrogenated styrene/butadiene block copolymers, styrene/isoprene block copolymers, hydrogenated styrene/isoprene block copolymers, styrene/isoprene/styrene tri-block copolymers, and hydrogenated styrene/isoprene/styrene tri-block copolymers. The invention further includes methods of manufacturing such inserts by injection molding, as well as a method of damping air- or structure-borne vibration in a longitudinal cavity with the aid of such an insert.

19 Claims, 2 Drawing Sheets

FIG. 1A
Before curing

FIG. 1B
After curing

BAFFLE WITH ENHANCED ACOUSTIC DAMPING PROPERTIES

CROSS-REFERENCE TO RELATED APPLICATIONS

This application is a continuation under 35 U.S.C. Section 365(c) and 120 of International Application No. PCT/EP2008/010711, filed Dec. 16, 2008, which published as WO 2010/069339 on Jun. 24, 2010, and which is incorporated herein by reference in its entirety.

FIELD OF THE INVENTION

The present invention relates to acoustically active and sealing baffles in the cavities of structural components of vehicles. Such baffles are also known as "pillar fillers"

BACKGROUND OF THE INVENTION

Modern vehicle concepts and structural designs of vehicles have a plurality of cavities which have to be sealed in order to prevent the ingress of moisture and contaminants, since the latter can result in corrosion from the inside on the corresponding body parts. This applies, in particular, to modern self-supporting body constructions in which a heavy frame construction is replaced by so-called "space frames". With the latter, use is made of a lightweight, structurally solid chassis made of prefabricated hollow sections. Such constructions have, depending upon the specific system, a number of cavities which have to be sealed against the penetration of moisture and contaminants. These cavities include the upwardly extending A-, B- and C-pillars supporting the roof structure, the roof rail, portions of the fenders, or the sill. In addition, these cavities transmit airborne sound in the form of unpleasant vehicle running noises and wind noises. Therefore, such sealing measures also serve to reduce the noises and to enhance the comfort of traveling in the vehicle.

During the assembly of the car, these frame parts and body parts containing cavities are prefabricated from half-shell components which were joined at a later time by welding and/or adhesive bonding so as to form the closed hollow section. Within this specification, such half-shell components after joining are called "interconnected walls", which surround the enclosed hollow section ("cavity"). With such a type of construction the cavity in the early body in white ("body shop") state of a vehicle body is accordingly easily accessible, so that sealing and acoustically damping baffle parts (sometimes referred to as "pillar fillers" or "cavity filler inserts") can be fixed in this early phase of body construction by mechanical hanging, by insertion into appropriate holding devices, bores or by gluing or welding to the cavity walls.

Most modern baffles or pillar fillers are designed to include a sealing material disposed on a support member or carrier. The carrier is generally manufactured from a rigid material, such as hard plastic, such that its shape approximates the shape of the cavity to be sealed. The carrier/sealing material combination is configured such that the carrier is inserted into a cavity. Typically, the sealing material is activated (thermally or chemically) to expand (or "foam") after insertion into the cavity so that the sealing material forms a seal with the walls of the cavity. Thus, the expanded sealing material creates an airtight seal between the carrier and the walls of the cavity.

WO 00/03894 A1 discloses a lightweight expandable baffle for sealing a cavity of a vehicle body at a predetermined cross section of the cavity. This baffle includes a rigid support plate having an outer periphery with a shape generally corresponding to but smaller than the shape of the cross section of the cavity. Said baffle comprises a heat expandable sealing material mounted to the outer periphery of the rigid support plate having an activation temperature range at which the material expands. The support plate is being formed of a material having a higher melting point than the activation temperature range of the sealing material. When activated, the sealing material expands radially from the rigid support plate to fill the cross-sectional cavity between the rigid support plate and the cavity walls.

WO 01/83206 A1 discloses a combined baffle and reinforcing assembly for use within the cavity of a structural member to dampen acoustic transmissions through the cavity and to provide reinforcement in a direction transverse to the longitudinal axis of the structural member. The combined assembly includes a synthetic carrier which comprises an interior area, a marginal rim and an attachment member preferably in a form of a clip suited for insertion to the corresponding hole in the wall of the structural member. The carrier is circumscribed by a continuous band of reinforcing material extending around the periphery of the carrier. The marginal rim of the carrier may include a base wall and a support flange for receiving the thermally expandable material thereon.

According to the state of the art, the carrier usually is shaped as a plate. This plate may be formed from metal or from thermoplastics, in which case the thermoplastics may optionally be fiber-reinforced. Preferred thermoplastics are polyamides, polyimides, polyoxypropylene or polyethylene terephthalate. The thermoplast has a melting point higher than the expansion temperature of the heat expandable material. The carrier plate, optionally including the support structure, is preferably made by injection molding. In preferred embodiments, the thermoplastic carrier plate and the heat expandable material are either formed in one co-extrusion process or in subsequent extrusion processes on the same injection molding unit.

In the pillar filler design of the state of the art, the carrier plate acts as a barrier which mainly ensures the sealing of the cavity and which contributes moderately to the acoustic damping properties of the complete baffle. The present invention solves the problem of increasing the acoustic damping efficiency of pillar fillers comprising a thermally inert (at the temperatures to which the pillar filler is exposed) carrier made of a thermoplastic material, and a thermally expandable ("foamable") material which, after foaming, fills the space between the carrier and the inner walls of the cavity.

SUMMARY OF THE INVENTION

An insert for sealing and acoustic damping of a longitudinal cavity having an interior surface, comprising
  a) one or more carrier plates made of a polymeric material (A) which does not deform when heated to a temperature not higher than 180° C.,
  b) a thermally expandable material (B),
  wherein the polymeric Material (A) comprises
    a main polymer (A1) which gives mechanical strength to the carrier plate, and
    at least one vibration-damping polymer (A2).

In one aspect of the invention, the main polymer (A1) may be selected from the group comprising: polyester, polypropylene, polyurethanes, polyamides, polyphenylene sulphides, polyphenylene ethers, polyphenylene sulfones, polyether imides and polyphenylene imides.

In one aspect of the invention, the vibration-damping polymer (A2) is selected from the group comprising: thermoplastic polyurethanes, styrene/butadiene block copolymers, hydrogenated styrene/butadiene block copolymers, styrene/isoprene block copolymers, hydrogenated styrene/isoprene block copolymers, styrene/isoprene/styrene tri-block copolymers, and hydrogenated styrene/isoprene/styrene tri-block copolymers.

In one aspect of the invention, the insert comprises at least a first and a second vibration-damping polymer (A2), the first vibration-damping polymer (A2) being selected from the group comprising: thermoplastic polyurethanes, styrene/butadiene block copolymers, hydrogenated styrene/butadiene block copolymers, styrene/isoprene block copolymers, hydrogenated styrene/isoprene block copolymers, and the second vibration-damping polymer (A2) being selected from the group comprising: styrene/isoprene/styrene tri-block copolymers, and hydrogenated styrene/isoprene/styrene tri-block copolymers.

In one aspect of the invention, the vibration-damping polymer (A2) is selected from polymers or co-polymers which, in pure form, have a glass transition temperature in the range of −25° C. to +30° C.

In one aspect of the invention, the insert comprises at least a first and a second vibration-damping polymer (A2), the first vibration-damping polymer (A2) having, in pure form, a glass transition temperature in the range from −25° C. to 0° C., preferably in the range from −20 to −5° C., and the second vibration-damping polymer (A2) having, in pure form, a glass transition temperature in the range from 0.1 to 30° C., preferably in the range from 4 to 20° C.

In one aspect of the invention, the insert comprises styrene/isoprene/styrene tri-block copolymers as a vibration-damping polymer (A2), alone or in mixture with other vibration-damping polymers (A2).

In one aspect of the invention, the carrier plate of the insert contains, relative to the total polymer content of the carrier plate, from 10 to 40% by weight, preferably from 15 to 25% by weight, of vibration-damping polymer (A2).

In another aspect of the invention, a method of manufacturing an insert for sealing and acoustic damping is provided comprising a step of injection-molding the carrier plate as step 1, wherein the main polymer (A1) and the vibration-damping polymer (A2) are mixed prior to or during step 1.

In one aspect of the invention, the method of manufacturing an insert for sealing and acoustic damping according to the invention comprises a step of injection-molding the carrier plate as step 1, wherein the main polymer (A1) and the vibration-damping polymer (A2) are simultaneously injected into a mould in step 1.

In one embodiment, the injection molded carrier plate obtained in step 1 is over-molded with the thermally expandable material (B) as step 2.

In another aspect of the invention, a method of damping air- or structure-borne vibration in a longitudinal cavity, said method comprising:
a) placing within said cavity a cavity filler insert according to one or more of claims 1 to 8 in a predetermined position within said longitudinal cavity, and
b) heating said thermally expandable material to a temperature effective to cause said thermally expandable material (B) to expand and come into contact with the interior surface of said cavity, thereby sealing off said cavity.

DETAILED DESCRIPTION OF THE DRAWINGS

FIG. 1: Crossectional view of a baffle design. The baffle shown in FIG. 1, by way of non-limiting example, comprises a carrier plate with a thickness of 1.5 mm and a support structure forming a groove for the thermally expandable material along its periphery, here shown as a cross section. In the unexpanded form, FIG. 1A, left figure, the thermally expandable material ("mastic") is shown as filling the groove of the carrier structure, and leaves an open space between the baffle and the inner cavity walls of a vehicle. After expanding and curing, FIG. 1B, right figure, the expanded material fills the space between the carrier plate and the inner cavity walls.

DETAILED DESCRIPTION OF THE INVENTION

According to the present invention, the problem of increasing the acoustic damping efficiency of pillar fillers by adding a vibration-damping polymer to the thermoplastic material of the carrier. Thus, the present invention, in one embodiment, provides an insert for sealing and acoustic damping of a longitudinal cavity having an interior surface, comprising
a) one or more carrier plates made of a polymeric material (A) which does not deform when heated to a temperature not higher than 180° C.,
b) a thermally expandable material (B),
wherein the polymeric Material (A) comprises
a main polymer (A1) which gives mechanical strength to the carrier plate, and
at least one vibration-damping polymer (A2).

Preferably, the one or more carrier plates are made of a polymeric material (A) which does not deform when heated to a temperature not higher than 220° C. The main polymer (A1) may be selected from polymeric materials which are known in the state of the art for the manufacture of the carrier plates of pillar fillers. For example, it may be selected from the group comprising: polyester, polypropylene, polyurethanes, polyamides (PA) like nylon, polyphenylene sulphides (PPS), polyphenylene ethers (PPE), polyphenylene sulfones (PPSU), polyether imides (PEI) and polyphenylene imides (PPI). Preferably, the main polymer (A1) is polyamide.

The vibration-damping polymer (A2) is preferably selected within the group consisting of thermoplastic polyurethanes (TPU) and block copolymers (including linear as well as radial block copolymers) of the A-B, A-B-A, A-(B-A)n-2-B, A-(B-A)n-1 and (A-B)n-Y types, wherein A is an aromatic polyvinyl ("hard") block and the B block represents a rubber-like ("soft") block of polybutadiene, polyisoprene or the like, which may be partly or completely hydrogenated, Y is a polyfunctional compound and n is an integer of at least 3. The blocks may be tapered or gradient in character or consist entirely of one type of polymerized monomer.

Hydrogenation of the B block removes originally present double bonds and increases the thermal stability of the block copolymer. Such copolymers may be preferred in certain embodiments of the present invention.

Suitable block copolymers include, but are not limited to, SBS (styrene/butadiene/styrene) copolymers, SIS (styrene/isoprene/styrene) copolymers, SEPS (styrene/ethylene/propylene/styrene) copolymers, SEEPS (styrene/ethylene/ethylene/propylene/styrene) or SEBS (styrene/ethylene/butadiene/styrene) copolymers.

Especially suitable block copolymers include styrene/isoprene/styrene triblock polymers, as well as fully or partially hydrogenated derivatives thereof, in which the polyisoprene block contains a relatively high proportion of monomer moieties derived from isoprene having a 1, 2 and/or 3, 4 configuration. Preferably, at least about 50% of the polymerized isoprene monomer moieties have 1, 2 and/or 3, 4 configurations, with the remainder of the isoprene moieties having a 1, 4 configuration. Such block copolymers are available from Kuraray Co., Ltd. under the trademark HYBRAR and may also be prepared using the methods described in U.S. Pat. No. 4,987,194, incorporated herein by reference in its entirety.

In certain preferred embodiments of the invention the "hard" blocks represent from about 15 to about 30 percent by weight of the block copolymer and the "soft" blocks represent from about 70 to about 85 percent by weight of the block copolymer. The glass transition temperature of the "soft" blocks is preferably from about −35 degrees C. to about 10 degrees C. while the glass transition temperature of the "hard" blocks is preferably from about 90 degrees C. to about 110 degrees C. The melt flow index of the block copolymer preferably is from about 0.5 to about 6 (as measured by ASTM D1238, 190 degrees C., 2.16 Kg). Typically, the block copolymer will have a number average molecular weight of from about 30,000 to about 300,000.

Examples of suitable thermoplastic polyurethanes (TPU) are those made according to conventional processes by reacting diisocyanates with compositions having at least two isocyanate reactive groups per molecule, preferably difunctional alcohols. Suitable organic diisocyanates to be used include, for example, aliphatic, cycloaliphatic, araliphatic, heterocyclic and aromatic diisocyanates.

Specific examples of diisocyanates include aliphatic diisocyanates such as, for example, hexamethylene-diisocyanate; cycloaliphatic diisocyanates such as, for example, isophorone-diisocyanate, 1,4-cyclohexane-diisocyanate, 1-methyl-2,4- and -2,6-cyclohexane-diisocyanate and the corresponding isomer mixtures, 4,4'-, 2,4'- and 2,2'-dicyclohexylmethane-diisocyanate and the corresponding isomer mixtures; and aromatic diisocyanates such as, for example, 2,4-toluoylene-diisocyanate, mixtures of 2,4- and 2,6-toluoylene-diisocyanate, 4,4'-diphenylmethane-diisocyanate, 2,4'-diphenylmethane-diisocyanate and 2,2'-diphenylmethane-diisocyanate, mixtures of 2,4'-diphenylmethane-diisocyanate and 4,4'-diphenylmethane-diisocyanate, urethane-modified liquid 4,4'-diphenylmethane-diisocyanates and/or 2,4'-diphenylmethane-diisocyanates, 4,4'-diisocyanato-1,2-diphenyl-ethane and 1,5-naphthylene-diisocyanate. Diphenylmethane-diisocyanate isomer mixtures with a 4,4'-diphenylmethane-diisocyanate content of greater than 96 wt. % are preferably used, and 4,4'-diphenylmethane-diisocyanate and 1,5-naphthylene-diisocyanate are used in particular. The diisocyanates mentioned above can be used individually or in the form of mixtures with one another.

The compounds reactive with the isocyanate groups include, but are not limited to, polyhydroxy compounds such as polyester polyols, polyether polyols or polycarbonate-polyols or polyols which may contain nitrogen, phosphorus, sulfur and/or silicon atoms, or mixtures of these. Linear hydroxyl-terminated polyols having on average from about 1.8 to about 3.0 Zerewitinoff-active hydrogen atoms per molecule, preferably from about 1.8 to about 2.2 Zerewitinoff-active hydrogen atoms per molecule, and having a number average molecular weight of 400 to 20,000 g/mol are preferably employed as polyol. These linear polyols often contain small amounts of non-linear compounds as a result of their production. Thus, these are also often referred to as "substantially linear polyols".

The polyhydroxy compounds with two or three hydroxyl groups per molecule in the number average molecular weight range of 400 to 20,000, preferably in the range of 1000 to 6000, which are liquid at room temperature, glassy solid/amorphous or crystalline, are preferably suitable as polyols. Examples are di- and/or trifunctional polypropylene glycols; random and/or block copolymers of ethylene oxide and propylene oxide can also be used. Another group of polyethers that can preferably be used includes the polytetramethylene glycols (poly(oxytetramethylene)glycol, poly-THF), which are produced, e.g., by the acid polymerization of tetrahydrofuran, the number average molecular weight range of these polytetramethylene glycols typically lying between 600 and 6000, preferably in the range of 800 to 5000.

The liquid, glassy amorphous or crystalline polyesters that can be produced by condensation of di- or tricarboxylic acids, such as, e.g., adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimerized fatty acid or mixtures thereof with low molecular-weight diols or triols, such as e.g. ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimerized fatty alcohols, glycerin, trimethylolpropane or mixtures thereof, are also suitable as polyols.

Another group of polyols to be used for making the TPU's are polyesters based on e-caprolactone, also known as "polycaprolactones".

However, polyester polyols of oleochemical origin can also be used. These polyester polyols can be produced, for example, by the complete ring opening of epoxidized triglycerides of an at least partially olefinically unsaturated, fatty acid-containing fat mixture with one or more alcohols with 1 to 12 C atoms and subsequent partial transesterification of the triglyceride derivatives to alkyl ester polyols with 1 to 12 C atoms in the alkyl radical. Other suitable polyols are polycarbonate polyols and dimerized diols (Henkel), as well as castor oil and its derivatives. The hydroxyfunctional polybutadienes, as obtainable, for example, with the trade name "Poly-bd", can be used as polyols for making the TPU's to be used according to the invention.

Preferably, combinations of polyether polyols and glassy amorphous or crystalline polyester polyols are used for making the TPU's.

Preferably, the polyols have an average functionality towards isocyanate from about 1.8 to 2.3, preferably 1.9 to 2.2, particularly about 2.0.

The thermoplastic polyurethanes may also be made by additionally using chain extending compounds like low molecular weight polyols such as ethylene glycol, propylene glycol or butadiene glycol or low molecular weight diamines such as 1,2-diaminoethylene, 1,3-diaminopropylene or 1,4-diaminobutane or 1,6-diaminohexane.

In preferred embodiments, the soft domains of the thermoplastic polyurethane are selected from the group consisting of poly(ethylene adipate), poly(1,4-butene adipate), poly(ethylene 1,4-butene adipate), poly(hexamethylene 2,2-dimethylpropylene adipate), polycaprolactone, poly(diethylene glycol adipate), poly(1,6-hexanediol carbonate) and poly(oxytetramethylene).

Other vibration-damping polymers (A2) suitable for use in the present invention include other types of block copolymers containing both hard segments and soft segments such as, for example, polystyrene/polydimethylsiloxane block copolymers, polysulfone/polydimethylsiloxane block copolymers, polyester/polyether block copolymers (e.g., copolyesters such as those synthesized from dimethyl terephthalate, poly (tetramethylene ether)glycol, and tetramethylene glycol), polycarbonate/polydimethylsiloxane block copolymers, polycarbonate/polyether block copolymers, copolyetheramides, copolyetheresteramides and the like. Vibration-damping polymer (A2)s which are not block copolymers but which generally are finely interdispersed multiphase systems or alloys may also be used, including blends of polypropylene with ethylene-propylene rubbers (EPR) or ethylene-propylene-diene monomer (EPDM) rubbers (such blends often being grafted or cross-linked).

The vibration-damping polymer (A2) is preferably selected from polymers or co-polymers which, in pure form, have a glass transition temperature (as measured by DSC=differential scanning calorimetry) in the range of −25° C. to +30° C. In a preferred embodiment, the carrier plate of the insert comprises at least a first and a second vibration-damping polymer (A2), the first vibration-damping polymer (A2) having, in pure form, a glass transition temperature in the range from −25° C. to 0° C., preferably in the range from −20 to −5° C., and the second vibration-damping polymer (A2) having, in pure form, a glass transition temperature in the range from 0.1 to 30° C., preferably in the range from 4 to 20° C.

Thus, the vibration-damping polymer (A2) may be selected from the group comprising: thermoplastic polyurethanes, styrene/butadiene block copolymers, hydrogenated styrene/butadiene block copolymers, styrene/isoprene block copolymers, hydrogenated styrene/isoprene block copolymers, styrene/isoprene/styrene tri-block copolymers, and hydrogenated styrene/isoprene/styrene tri-block copolymers. It is especially preferred that the insert comprises styrene/isoprene/styrene tri-block copolymers as a vibration-damping polymer (A2), alone or in mixture with other vibration-damping polymers (A2).

In a preferred embodiment, the insert comprises at least a first and a second vibration-damping polymer (A2), the first vibration-damping polymer (A2) being selected from the group comprising: thermoplastic polyurethanes, styrene/butadiene block copolymers, hydrogenated styrene/butadiene block copolymers, styrene/isoprene block copolymers, hydrogenated styrene/isoprene block copolymers, and the second vibration-damping polymer (A2) being selected from the group comprising: styrene/isoprene/styrene tri-block copolymers, and hydrogenated styrene/isoprene/styrene tri-block copolymers. Preferably, the first vibration damping polymer has a glass transition temperature in the range from −25 to 0.0° C., and the second vibration damping polymer has a glass transition temperature in the range from 0.1 to 30° C.

The first and the second vibration damping polymer are preferably both selected from styrene/isoprene/styrene tri-block copolymers (SIS), and hydrogenated styrene/isoprene/styrene tri-block copolymers. The non-hydrogenated tri-block copolymers are especially preferred. The styrene content is preferably in the range of 15 to 25%, more preferably in the range of 19 to 21%. Suitable materials are, for example: Hybrar® 5125 (glass transition temperature by DSC: −13° C.) for the first vibration damping polymer, and Hybrar® 5127 (glass transition temperature by DSC: +8° C.) for the second vibration damping polymer b), both available from Kuraray.

The vibration-damping polymers (A2) mentioned above are known as components of foamable materials yielding foams with very good vibration damping properties. They have been used before in vibration damping devices as the thermally extendable material ("B" in the sense of this invention) which is disposed on a carrier, but not as a component of the carrier material itself. Examples of such devices of the state of the art are given in WO2007/039308, WO2007/039309, and in the international patent application PCT/EP2007/008141, unpublished at the filing date of the present patent application.

Preferably, the carrier plate of the insert contains, relative to the total polymer content of the carrier plate, from 10 to 40% by weight, preferably from 15 to 25% by weight, of vibration-damping polymer (A2). If a first and a second vibration damping polymer are used according to the description above, their mass ratio may be in the range of 5:1 to 1:5, preferably 3:1 to 1:3, and more preferably 2:1 to 1:2.

In addition to the polymers A1 and A2 to which the weight ratios of the preceding paragraph refer, the carrier plate may contain fillers like, for example, calcium carbonate or barium sulfate. The carrier may also be fiber reinforced, e.g. with glass fibers.

The cavity filler insert of the present invention may be substantially planar. "Substantially planar" in the context of the present invention means that the cavity filler insert is relatively flat and thin and has a maximum thickness that is significantly less than the maximum width of the insert. For example, the maximum thickness of the insert is typically less than 20% of the insert's maximum width. Typically, the thickness of the thermally expandable material that is present at the periphery of the cavity filler insert is from about 4 to about 10 mm. In this context, "thickness" means the dimension of the cavity filler insert that is perpendicular to the plane of the insert and parallel to the longitudinal axis of the hollow structural member in which the insert is to be positioned.

In another embodiment, the carrier plate of the insert is bent, as described in the international patent application PCT/EP2007/007234, unpublished at the filing date of the present patent application. Like in this document, the baffle of the present invention may comprise a carrier plate with an outer perimeter and a strand of a thermally expandable material along the major part of the outer perimeter. This strand circumscribes a central section of the carrier plate which is not covered by the heat expandable material. The outer perimeter defines a mean plane limited by the outer perimeter, and the central section of the carrier plate is bent away from the mean plane in a way that the point on the central section which has the greatest distance from the mean plane lies at a distance from the mean plane which is at least 5% of the maximum linear length of the carrier plate.

A plate is defined as a structure having a thickness in a direction of minimum extension (called the "perpendicular plate axis") which is at most 10% of the length of the structure in the direction of its maximum length, and at most 25% of the minimum width of the structure in a direction perpendicular to the "perpendicular plate axis". Ideally, the plate is flat, with the exception of a support structure for the thermally expandable material B which might stick out of the plate. In the sense of one embodiment of this invention, however, the central section of the carrier plate is bent to form a vaulted or "bowl-like" structure, so that the plate has a convex "upper" and a concave "lower" surface. Instead of or in addition to this bent or vaulted structure, the plate may exhibit a lumped mass distribution. This means that the mass of the plate is not distributed equally, but a part of the mass is concentrated around one or more selected points. Especially, the mass may be concentrated around the centre of gravity of the plate or, if the plate is bent, around the point on the plate which is closest to the centre of gravity of the bent structure.

The thermally expandable material (B) may be any material known in the field of pillar fillers. It can be made, for example, from ethylene/vinyl-acetate copolymers (EVA), copolymers of ethylene with (meth)acrylate esters, which optionally also contain (meth)acrylic acid incorporated proportionately by polymerization, random copolymers or block copolymers of styrene with butadiene or isoprene or the hydrogenation products thereof. The latter may also be triblock copolymers of the SBS, SIS type or the hydrogenation products thereof, SEBS or SEPS. In addition, the polymer compositions may also contain cross-linking agents, coupling agents, plasticizers as well as further auxiliary substances and additives.

With a view to achieving a sufficient foaming capacity and expandability, these polymer compositions may also contain blowing agents. Suitable, in principle, by way of blowing agents are all known blowing agents such as, for example, the "chemical blowing agents" which release gases as a result of decomposition or "physical blowing agents", i.e. expanding hollow beads. Examples of the first-mentioned blowing agents are azobisisobutyronitrile, azodicarbonamide, dinitrosopentamethylenetetramine, 4,4'-oxybis-(benzene-sulfonic acid hydrazide), diphenylsulfone-3,3'-disulfohydrazide, benzene-1,3-disulfohydrazide, p-toluene sulfonylsemicarbazide. Examples of the physical blowing agents are expandable plastic hollow microbeads based on polyvinylidene-chloride copolymers or acrylonitrile/(meth) acrylate copolymers, such as are commercially available, for example, under the names "Dualite®" and "Expancel®" from Pierce & Stevens and Casco Nobel, respectively. Preferably, the heat expandable material has an activation temperature above 120° C. and below 200° C.

Furthermore, the thermally expandable material described in WO2007/039309, and in the international patent application PCT/EP2007/008141 (unpublished at the filing date of the present patent application) may be used as the thermally expandable material (B) in the present invention.

Thus, the thermally expandable material may be chosen to correspond to the following claims of WO2007/039309:

1. "A thermally expandable material that when expanded has a Young's storage modulus E' between 0.1 MPa and 1000 MPa and a loss factor higher than 0.3 at a temperature between −10 and +40 degrees C. in the frequency range 0 to 500 Hz.
2. A thermally expandable material in accordance with Claim 1, wherein said thermally expandable material comprises at least one thermoplastic elastomer, at least one non-elastomeric thermoplastic, at least one stabilizer or antioxidant, at least one blowing agent, and at least one curing agent.
3. A thermally expandable material in accordance with Claim 1 or Claim 2, wherein said thermally expandable material is comprised of at least one peroxide curing agent.
4. A thermally expandable material in accordance with any of Claims 1 to 3, wherein said thermally expandable material is comprised of at least one thermoplastic elastomer selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers.
5. A thermally expandable material in accordance with any of Claims 1 to 4, wherein said thermally expandable material is comprised of at least one non-elastomeric thermoplastic selected from the group consisting of ethylene/vinyl acetate copolymers and ethylene/methyl acrylate copolymers.
6. A thermally expandable material in accordance with any of Claims 1 to 5, wherein said thermally expandable material is comprised of at least one non-elastomeric thermoplastic selected from the group consisting of ethylene/vinyl acetate copolymers and ethylene/methyl acrylate copolymers and at least one thermoplastic elastomer selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers.
7. A thermally expandable material in accordance with any of Claims 1 to 6, wherein said thermally expandable material contains less than 10 weight percent filler.
8. A thermally expandable material in accordance with any of Claims 1 to 7, wherein said thermally expandable material is comprised of at least one olefinically unsaturated monomer or oligomer.
9. A thermally expandable material in accordance with any of Claims 1 to 8, wherein said thermally expandable material is comprised of at least one C1 to C6 alkyl (meth)acrylate.
10. A thermally expandable material in accordance with any of Claims 1 to 9, wherein said thermally expandable material is comprised of at least one plasticizer.
11. A thermally expandable material in accordance with any of Claims 1 to 10, wherein said thermally expandable material is comprised of at least one wax.
12. A thermally expandable material in accordance with any of Claims 1 to 11, wherein said thermally expandable material is comprised of at least one latent chemical blowing agent.
13. A thermally expandable material in accordance with any of Claims 1 to 12, wherein said thermally expandable material is comprised of at least one tackifying resin.
14. A thermally expandable material in accordance with any of Claims 1 to 13, wherein said thermally expandable material is comprised of at least one blowing agent activator.
15. A thermally expandable material in accordance with any of Claims 1 to 14, wherein said thermally expandable material is comprised of at least one olefinically unsaturated monomer or oligomer having only one carbon-carbon double bond per molecule.
16. A thermally expandable material in accordance with any of Claims 1 to 15, wherein said thermally expandable material is comprised of at least one styrene/isoprene/styrene triblock polymer or fully or partially hydrogenated derivative thereof with at least about 50% of the polymerized isoprene monomer moieties having 1, 2 and/or 3, 4 configurations.
17. A thermally expandable material in accordance with Claim 1, wherein said thermally expandable material comprises:
   a). from 25 to 70% by weight of at least one thermoplastic elastomer;
   b). from 15 to 40% by weight of at least one non-elastomeric thermoplastic;
   c). from 0.01 to 2% by weight of at least one stabilizer or antioxidant;
   d). from 2 to 15% by weight of at least one blowing agent; and
   e). from 0.5 to 4% by weight of at least one curing agent.
18. A thermally expandable material in accordance with Claim 1, wherein said thermally expandable material comprises:
   a). from 35 to 55% by weight of at least one thermoplastic elastomer selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers;

b). from 20 to 35% by weight of at least one non-elastomeric thermoplastic selected from the group consisting of ethylene/vinyl acetate copolymers and ethylene/methyl acrylate copolymers;

c). from 0.05 to 1% by weight of at least one stabilizer or antioxidant;

d). at least one latent chemical blowing agent in an amount effective to cause the expandable material to expand at least 100% in volume when heated at a temperature of 150 degrees C. for at least 20 minutes;

e). from 0.5 to 4% by weight of at least one peroxide; and f). from 0.5 to 2% by weight of at least one olefinically unsaturated monomer or oligomer;

wherein said thermally expandable material contains less than 10% by weight filler.

19. A thermally expandable material in accordance with Claim 1, wherein said thermally expandable material comprises:

a). from 25 to 70% by weight of at least one thermoplastic elastomer;

b). from 15 to 40% by weight of at least one non-elastomeric thermoplastic;

c). from 0.01 to 2% by weight of at least one stabilizer or antioxidant;

d). from 2 to 15% by weight of at least one blowing agent;

e). from 0.5 to 4% by weight of at least one curing agent;

f). at least one tackifying resin, in an amount up to 10% by weight;

g). at least one wax, in an amount up to 10% by weight; and h) at least one plasticizer, in an amount up to 5% by weight.

20. A thermally expandable material in accordance with Claim 1, wherein said thermally expandable material comprises:

a). from 35 to 55% by weight of at least one styrene/isoprene block copolymer thermoplastic elastomer selected from the group consisting of styrene/isoprene block copolymers;

b). from 20 to 35% by weight of at least one non-elastomeric thermoplastic selected from the group consisting of ethylene/vinyl acetate copolymers;

c). from 0.05 to 1% by weight of at least one stabilizer or antioxidant;

d). at least one latent chemical blowing agent in an amount effective to cause the expandable material to expand at least 100% in volume when heated at a temperature of 150 degrees C. for at least 20 minutes;

e). from 0.5 to 4% by weight of at least one organic peroxide;

f). from 0.5 to 2% by weight of at least one C1 to C6 alkyl(meth)acrylate;

g). at least one tackifying resin, in an amount up to 10% by weight;

h). at least one plasticizer, in an amount up to 5% by weight; and i). at least one wax, in an amount up to 10% by weight;

wherein said thermally expandable material contains less than 10% by weight filler."

More details can be found in the specification of WO2007/039309.

Alternatively, the thermally expandable material (B) used in the present invention may correspond to the claims of the international patent application PCT/EP2007/008141 (unpublished at the filing date of the present patent application):

1. "A thermally expandable material comprising:

a) from 3 to 40% by weight of a first thermoplastic elastomer having a first glass transition temperature, b) from 3 to 40% by weight of a second thermoplastic elastomer having a second glass transition temperature, wherein the first and the second glass transition temperature differ by at least 10° C., c) from 5 to 50% by weight of at least one thermoplastic polymer selected from the group consisting of polymers and copolymers with at least one polymerizable C=C double bond, d) from 0 to 30% by weight of at least one tackifying resin, e) at least one latent chemical blowing agent in an amount effective to cause the expandable material to expand at least 50% in volume when heated at a temperature of 150° C. for at least 20 minutes, wherein the sum of components a) to e) is less than 100% by weight, and the remainder to 100% by weight is made up of further components or adjuvants.

2. A thermally expandable material according to claim 1, wherein the first thermoplastic elastomer a) and/or the second thermoplastic elastomer b) is selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers.

3. A thermally expandable material according to claim 2, wherein components a) and b) are selected from styrene/isoprene/styrene tri-block copolymers, and hydrogenated styrene/isoprene/styrene tri-block copolymers.

4. A thermally expandable material according to one or more of claims 1 to 3, wherein the first thermoplastic elastomer a) has a glass transition temperature in the range from −25 to 0.0° C., preferably in the range from −20 to −5° C.

5. A thermally expandable material according to one or more of claims 1 to 4, wherein the second thermoplastic elastomer b) has a glass transition temperature in the range from 0.1 to 30° C., preferably in the range from 4 to 20° C.

6. A thermally expandable material according to one or more of claims 1 to 5, wherein at least one thermoplastic polymer c) is selected from the group consisting of ethylene/vinyl acetate copolymers and ethylene/methyl acrylate copolymers.

7. A thermally expandable material according to one or more of claims 1 to 6, wherein at least one tackifying resin d) is present in an amount of from 1 to 20% by weight.

8. A thermally expandable material according to claim 7, wherein the tackifying resin d) is selected from aliphatic hydrocarbon resins.

9. A thermally expandable material according to one or more of claims 1 to 8, which is cured or pre-cured by irradiation with actinic radiation, and/or which contains as a further component at least one chemical curing agent as component f).

10. A thermally expandable material according to claim 9, which contains at least one chemical curing agent f) based on sulphur and/or sulphur compounds, preferably a mixture of elemental sulfur and at least one organic di- or polysulfide.

11. A thermally expandable material according to one or more of claims 1 to 10, wherein at least one of the following conditions is met for the relative amounts of the components:

component a) is present in an amount of from 5 to 20% by weight, preferably of from 8 to 16% by weight;

component b) is present in an amount of from 15 to 40% by weight, preferably of from 20 to 35% by weight;

component c) is present in an amount of from 10 to 25% by weight, preferably of from 12 to 20% by weight;

component d) is present in an amount of from 2 to 10% by weight, preferably of from 3 to 8% by weight;

component e) is present in an amount of from 1 to 20% by weight, preferably of from 2 to 10% by weight;

a chemical curing agent f) is present in an amount of from 0.2 to 5% by weight, preferably of from 0.7 to 2% by weight, wherein the sum of components a) to f) is less than 100% by weight, and the remainder to 100% by weight is made up of further components or adjuvants.

12. A thermally expandable material according to one or more of claims 1 to 11 comprising:

a) from 5 to 20% by weight of a first thermoplastic elastomer selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers, which has a glass transition temperature in the range from −25 to 0.0° C., b) from 15 to 40% by weight of a second thermoplastic elastomer selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers, which has a glass transition temperature in the range from 0.1 to 30° C., c) from 10 to 25% by weight of at least one thermoplastic polymer selected from the group consisting of ethylene/vinyl acetate copolymers and ethylene/methyl acrylate copolymers, d) from 2 to 10% by weight of at least one tackifying resin, e) at least one latent chemical blowing agent in an amount effective to cause the expandable material to expand at least 50% in volume when heated at a temperature of 150° C. for at least 20 minutes, f) from 0.5 to 4% by weight of at least one curing agent based on sulfur and/or sulfur compounds, wherein the sum of components a) to f) is less than 100% by weight, and the remainder to 100% by weight is made up of further components or adjuvants.

13. A thermally expandable material according to one or more of claims 1 to 12, wherein the further components or adjuvants comprise one or more of:

g) from 5 to 40% by weight fillers, h) from 2 to 20% by weight plasticizer, i) from 1 to 5% by weight curing catalyst, k) from 0.05 to 5% by weight anti-oxidant and/or stabilizer, l) from 0.05 to 5% by weight accelerator agent, m) from 1 to 10% by weight urea.

14. A thermally expandable material according to claim 13, wherein the curing catalyst i) is selected from zinc compounds.

15. A thermally expandable material according to claim 13 or claim 14, wherein the accelerator agent l) is selected from thiazole and sulfenamides, and mixtures thereof."

As a rule, the thermally expandable (heat expandable) material completely surrounds the carrier plate and is preferably located in a U-shaped boundary or radial groove forming a support structure, whereby, as a rule, the thermally expandable material protrudes from the open side of the U-shaped part. However, L-shaped support structures are also possible. Usually, but not necessarily, the carrier plate and the support structure will be made of the same material. If the carrier plate and the support structure are made of the same thermoplastic material, they usually will be formed together in one single injection molding step.

In other embodiment, the baffle comprises two parallel carrier plates with the thermally expandable material (B) disposed in-between, at least along the peripheral section of the plates.

The cross sectional shape of the insert or baffle will be adapted to the cross section of the pillar or hollow frame element, whereby, in the unexpanded and uncured form, the cross section of the baffle carrier plus heat expandable material is smaller than the cross sectional opening of the hollow frame element or pillar. This allows the process fluids like degreasing fluids, phosphating fluids and electro coat paint to flow freely through the hollow frame elements and pillars and wetting their inner walls completely. The heat expandable polymer composition is activated in the e-coat oven (sometimes also referred to as "body-shop oven") during the curing of the electro coat. At this point the heat expandable material (B) expands radially round the perimeter of the baffle, possibly guided by the walls of the support structure, cures and adheres securely to the inner walls of the hollow frame elements or pillars, thereby effectively sealing these hollow elements.

As usual in the field of the present invention, the insert or baffle preferably comprises at least one attachment member or fastener for securing the baffle in the cavity. Any of the devices known in the art to be capable of securing a carrier bearing an expandable material to the interior wall of a structural member cavity may be utilized as an attachment member in the cavity filler inserts or baffles of the present invention, and the selection of a particular design is not believed to be particularly critical. For example, the attachment member may include two or more resiliently deflectable barbs configured for secured receipt in an opening in the structural member. Each barb may comprise a shank bearing a retaining piece that protrudes at an angle to the shank so as to form a hook. Such an attachment member is inserted into the cavity wall opening with application of minor force, causing the barbs reversibly bend together and towards each other. After the barbs have passed through the opening, they return to their normal position apart from each other. This allows the retaining pieces to engage with the outer surface of the structural member wall around the periphery of the opening, thereby preventing the attachment member from being readily withdrawn through the opening and securing the cavity filler insert within the cavity. Affixing the baffle in this manner so as to prevent it from being easily displaced is highly desirable, since otherwise the handling that the structural member will normally encountered during assembly of the vehicle prior to heating and activating the expandable material is likely to cause the baffle to no longer be properly positioned in the desired location within the cavity.

Other types of attachment members may also be used for this purpose, including, for example, a "Christmas tree"-type fastener (typically fabricated of a resilient plastic) having an elongated portion with multiple angled flanges. The cavity filler insert or baffle may have one attachment member or a plurality of attachment members, of the same type or different types.

Typically, the attachment member projects radially from the baffle and may be generally parallel to the mean plane of the baffle or in the mean plane of the baffle. Preferably, the attachment members (fasteners) are made of the same material as the carrier plate, and are integrally molded together with the carrier plate in the same injection molding step. The heat expandable material (B) will usually be disposed in a way to surround the basis of the fastener (the section of the fastener which forms the connection with the carrier plate), so that the opening in the carrier wall into which the fastener is inserted will be closed and sealed by the expanded and cured heat expandable material.

As usual in the field of pillar fillers or baffles, the carrier plate, possibly together with the support structure for the thermally expandable material and the fasteners, are fabricated by injection molding the melted material for the carrier plate into a mould. For manufacturing a carrier plate according to the present inventions, two procedures are possible. In a first procedure, the main polymer (A1) for making the carrier plate is mixed with the one or more vibration damping polymer(s) (A2) before injecting the mixture into the mould. This mixture can be prepared either by mixing the melted polymers (A1) and (A2), or by mixing particles, e.g. granules, of the solid polymers before melting them by heating. In a second procedure, the melted polymers (A1) and (A2) are co-injected simultaneously, but separately in to the mould.

Thus, the present invention also includes two processes for manufacturing a carrier plate according to the present invention. In a first embodiment, the present invention relates to a method of manufacturing an insert for sealing and acoustic damping according to the present invention comprising a step of injection-molding the carrier plate as step 1, wherein the main polymer (A1) and the one or more vibration-damping polymer(s) (A2) are mixed prior to or during step 1. In a second embodiment, the present invention relates to a method of manufacturing an insert for sealing and acoustic damping according to the present invention, comprising a step of injection-molding the carrier plate as step 1, wherein the main polymer (A1) and the one or more vibration-damping polymer(s) (A2) are simultaneously injected into a mould in step 1.

Preferably, the injection molded carrier plate obtained in step 1 is over-molded with the thermally expandable material (B) as step 2. But it is also possible to manufacture the thermally expandable material (B) independently from the carrier plate, e.g. by extruding it in the form of a strand. This strand may then be cut and fixed to the carrier plate by some fixing means.

Finally, the present invention also comprises a method of damping air- or structure-borne vibration in a longitudinal cavity, said method comprising:
a) placing within said cavity a cavity filler insert according to the present invention in a predetermined position within said longitudinal cavity, and
b) heating said thermally expandable material to a temperature effective to cause said thermally expandable material (B) to expand and come into contact with the interior surface of said cavity, thereby sealing off said cavity. As usual in the field of the present invention, the heating takes place in the oven in which the first coating layer of the vehicle body, usually consisting of e-coat, is cured ("baked"). In this oven, the car body is heated to a temperature in the range of 110 to 150° C. The thermally expandable material (B) is, therefore, preferably selected so that it expands irreversibly and cures in this temperature range.

EXAMPLE

Figure 1A:
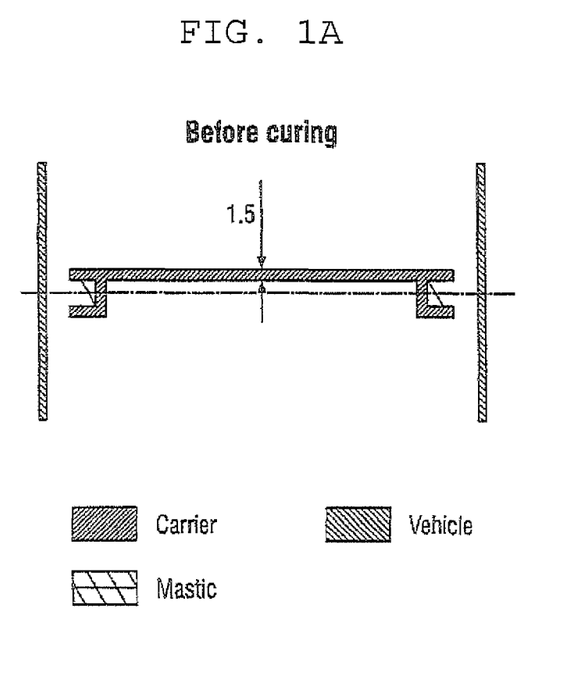
Figure 1B:
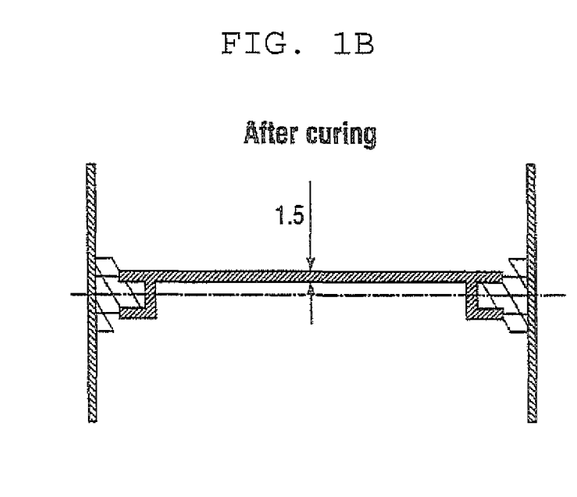

In order to show the merits of the concept of the present invention, the sound transmission loss of two baffles according to FIG. 1 (after foaming) has been calculated. In the comparison calculation, the damping property of the carrier plate was assumed to be 5%. For an inventive carrier plate containing SIS tri-block co-polymer the sound transmission loss was calculated for 20% damping. The thickness of the carrier plates in both cases was 1.5 mm.

Figure 2:
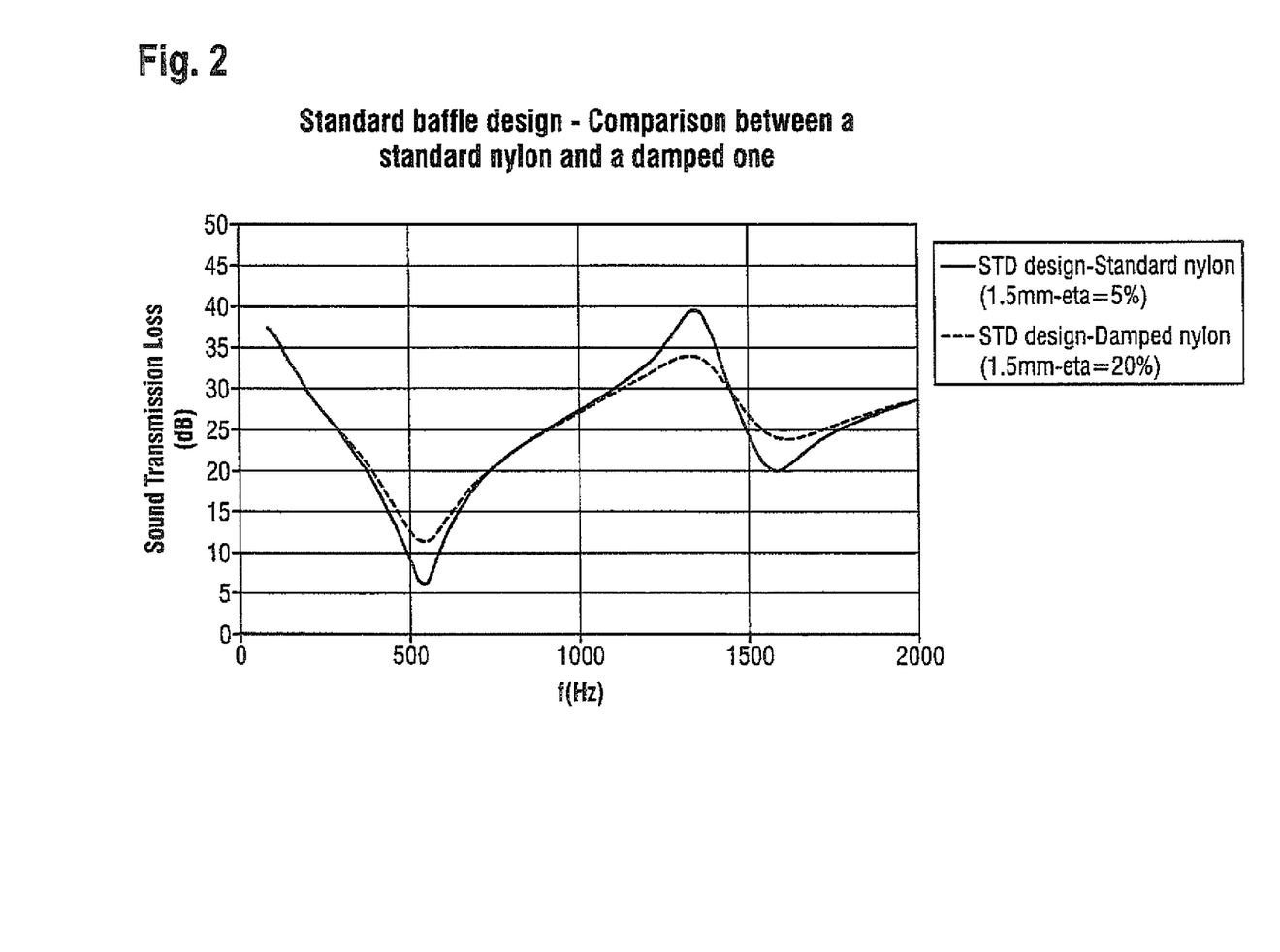
FIG. 2: Calculated sound transmission loss in dB for a baffle of FIG. 1 as a function of frequency, showing the curve for a carrier plate with 5% damping (standard nylon, comparison), and for 20% damping (containing SIS tri-block co-polymer) according to the invention).

FIG. 2 shows the calculated sound transmission loss in dB (=decibel) as a function of the frequency. The calculation shows an improvement of the sound transmission loss in the important regions of the first and second resonant frequencies (about 500 Hz and about 1500 Hz, respectively) of up to 6 dB when the curve for 5% damping is compared with the curve for 20% damping.

What is claimed is:
1. An insert for sealing and acoustic damping of a longitudinal cavity having an interior surface, comprising
 a) one or more carrier plates made of a polymeric material (A) which does not deform when heated to a temperature not higher than 180° C., comprising a peripheral section and a central section, and
 b) a thermally expandable material (B), wherein the polymeric material (A) comprises
 a main polymer (A1) which gives mechanical strength to the carrier plate and comprises: polyester, polypropylene, polyurethanes, polyamides, polyphenylene sulphides, polyphenylene ethers, polyphenylene sulfones, polyether imides and/or polyphenylene imides, and
 at least one vibration-damping polymer (A2) which comprises: thermoplastic polyurethanes, styrene/butadiene block copolymers, hydrogenated styrene/butadiene block copolymers, styrene/isoprene block copolymers, hydrogenated styrene/isoprene block copolymers, styrene/isoprene/styrene tri-block copolymers, and/or hydrogenated styrene/isoprene/styrene tri-block copolymers.

2. The insert of claim 1 wherein the insert comprises at least a first and a second vibration-damping polymer (A2), wherein
 the first vibration-damping polymer (A2) comprises: thermoplastic polyurethanes, styrene/butadiene block copolymers, hydrogenated styrene/butadiene block copolymers, styrene/isoprene block copolymers, and/or hydrogenated styrene/isoprene block copolymers, and
 the second vibration-damping polymer (A2) comprises: styrene/isoprene/styrene tri-block copolymers, and/or hydrogenated styrene/isoprene/styrene tri-block copolymers.

3. The insert of claim 1 wherein the vibration-damping polymer (A2) is selected from polymers or co-polymers which, in pure form, have a glass transition temperature in a range of −25° C. to +30° C.

4. The insert of claim 3 wherein the insert comprises at least a first and a second vibration-damping polymer (A2), the first vibration-damping polymer (A2) having, in pure form, a glass transition temperature in a range from −25° C. to 0° C., and the second vibration-damping polymer (A2) having, in pure form, a glass transition temperature in the range from 0.1 to 30° C.

5. The insert of claim 1 wherein the insert comprises styrene/isoprene/styrene tri-block copolymers as a vibration-damping polymer (A2), alone or in mixture with other vibration-damping polymers (A2).

6. The insert of claim 1 wherein the carrier plate of the insert contains, relative to total polymer content of the carrier plate, from 10 to 40% by weight, of vibration-damping polymer (A2).

7. The insert of claim 2 wherein the first and a second vibration damping polymers are present in a mass ratio in a range of 5:1 to 1:5.

8. The insert of claim 1 wherein the at least one vibration-damping polymer (A2) comprise at least one block copolymer containing both hard segments and soft segments.

9. The insert of claim 8 wherein the hard segments represent from about 15 to about 30 percent by weight of the block copolymer and the soft segments represent from about 70 to about 85 percent by weight of the block copolymer.

10. The insert of claim 1 wherein thermally expandable material (B) completely surrounds the one or more carrier plates.

11. The insert of claim 1 wherein the thermally expandable material (B) is located on the peripheral section of the one or more carrier plates.

12. The insert of claim 1 wherein the one or more carrier plates comprises a radial groove on the peripheral section thereby forming a support structure in which the thermally expandable material (B) is located.

13. The insert of claim 1 wherein at least one of the one or more carrier plates is a carrier plate comprising an outer perimeter and a strand of a thermally expandable material disposed along a major part of the outer perimeter, said strand circumscribing the central section of said carrier plate, wherein the outer perimeter defines a mean plane limited by the outer perimeter, and the central section of the carrier plate is bent away from the mean plane such that a point on the central section having a greatest distance from the mean plane lies at a distance from the mean plane which is at least 5% of a maximum linear length of the carrier plate.

14. The insert of claim 1 wherein the one or more carrier plates comprises two parallel carrier plates with the thermally expandable material (B) disposed therebetween, at least along the peripheral section of the plates.

15. A method of manufacturing an insert for sealing and acoustic damping according claim 1, comprising a step of injection-molding the carrier plate as step 1, wherein the main polymer (A1) and the vibration-damping polymer (A2) are mixed prior to or during step 1.

16. The method of claim 15 wherein the injection molded carrier plate obtained in step 1 is over-molded with the thermally expandable material (B) as step 2.

17. A method of manufacturing an insert for sealing and acoustic damping according claim 1, comprising a step of injection-molding the carrier plate as step 1, wherein the main polymer (A1) and the vibration-damping polymer (A2) are simultaneously injected into a mold in step 1.

18. The method of claim 17 wherein the injection molded carrier plate obtained in step 1 is over-molded with the thermally expandable material (B) as step 2.

19. A method of damping air- or structure-borne vibration in a longitudinal cavity, said method comprising:
  a) placing within a longitudinal cavity a cavity filler insert according to claim 1 in a predetermined position within said longitudinal cavity, and
  b) heating the thermally expandable material (B) to a temperature effective to cause said thermally expandable material (B) to expand and come into contact with at least one interior surface of said cavity, thereby sealing off said cavity.

* * * * *